…

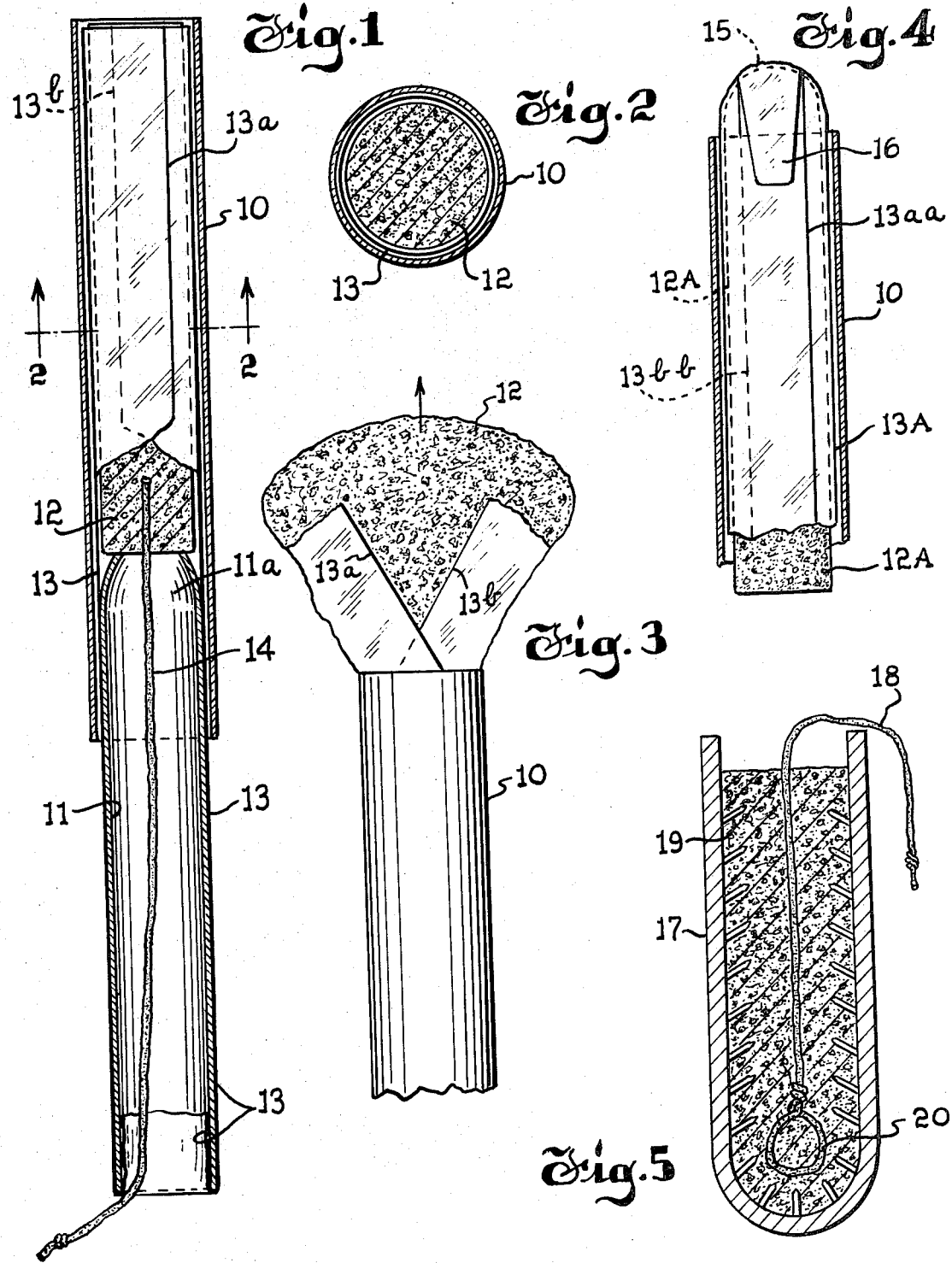

United States Patent
Bleuer

[15] 3,674,025
[45] July 4, 1972

[54] TAMPON ASSEMBLY

[72] Inventor: Keith T. Bleuer, 1663 Wilshire Drive, N.E., Rochester, Minn. 55901

[22] Filed: April 14, 1970

[21] Appl. No.: 28,381

[52] U.S. Cl. ........................................................128/263
[51] Int. Cl. ........................................................A61l 15/10
[58] Field of Search ..............................................128/263

[56] References Cited

UNITED STATES PATENTS

| | | | |
|---|---|---|---|
| 3,433,225 | 3/1969 | Voss et al. | 128/263 |
| 2,934,068 | 4/1960 | Graham Jr. et al. | 128/263 |
| 2,832,342 | 4/1958 | Wingenroth | 128/263 |

Primary Examiner—Lawrence Charles
Assistant Examiner—J. H. Wolff

[57] ABSTRACT

A tampon assembly including an outer tube and an inner tube telescoped into the outer tube, with a tampon body of elastomeric sponge material in the outer tube and expelled therefrom by means of the inner tube. A sheath of thin flexible low-friction material is disposed between the tampon body and the outer tube to facilitate the expulsion of the tampon body from the outer tube. The tampon body may be formed within a mold having inwardly extending spike-like projections on its inner surface to provide fluid passing openings on the exterior surface on the tampon body.

10 Claims, 5 Drawing Figures

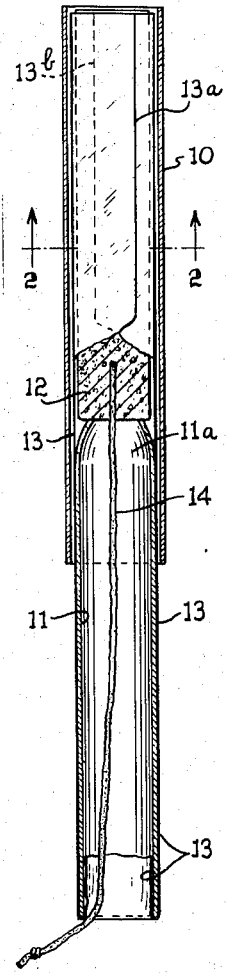

TAMPON ASSEMBLY

The invention relates to tampons and more particularly to those for catamenial usage.

It is an object of the invention to provide an improved tampon assembly, particularly for catamenial usage, including a fluid absorbing tampon body of elastomeric sponge material which is contained in an outer tube and is expelled therefrom, with a low friction means being provided on the outer surface of the tampon body so that it may be easily expelled from the outer tube even though the tampon body when in free condition has a diameter substantially greater than the inner diameter of the outer tube. More particularly, it is an object of the invention to provide a sheath of low friction material about the tampon body so that the tampon body may easily slide out of the outer tube.

It is also an object of the invention to provide an improved method and mold for making a tampon body of this type.

The invention consists of the novel constructions and methods to be hereinafter described and claimed for carrying out the above stated objects, and such other objects as will be apparent from the following description of preferred embodiments of the invention, illustrated with reference to the accompanying drawing, wherein:

FIG. 1 is a longitudinal sectional view of a tampon assembly incorporating principles of the invention;

FIG. 2 is a sectional view on an enlarged scale taken on line 2—2 of FIG. 1;

FIG. 3 is a partial side elevational view of tampon assembly showing the tampon partially ejected from the rest of the assembly;

FIG. 4 is a partial longitudinal sectional view of a modified tampon assembly incorporating principles of the invention; and FIG. 5 is a longitudinal sectional view of a mold in which the tampon of the assembly may be formed Like characters of reference indicate like parts in the several views.

Referring now to the drawing, the tampon assembly illustrated in FIGS. 1 and 2 may be seen to comprise, in general, an outer tube 10, an inner tube 11 telescoped in the tube 10, a tampon element or body 12 of fluid absorbing material and a sheath 13 of flimsy, flexible thin sheet material which overlies the tube 11 and is positioned to surround the element 12 within the outer tube 10.

The tube 11 at its upper end within the tube 10 preferably is spun inwardly at 11a so as to have a smaller diameter at this end to contact the element 12 at a place spaced from the outer surface of the element 12. Both of the tubes 10 and 11 may be formed from thin, relatively rigid material, such as cardboard or paperboard or plastic, and there is sufficient clearance between the tubes 10 and 11 to allow for the sheath 13 between the tubes. The tampon element 12 is of a flexible sponge which has a considerably greater diameter when released from or is outside of the tube 10 and which is compressed from normal uncompressed condition when inside the tube 10 and which therefore exerts a substantial outward force on the inside surface of the tube 10 when inside the tube 10. The sponge material from which the tampon element 12 is formed may be any suitable elastomeric material, such a natural or artificial rubber or one or more of the "poly" plastics which inherently in sponge form have substantial compressibility. A sponge of this type may be distinguished from cellulose sponge which is disclosed in tampon form in U.S. Pat. No. 2,854,978, and which has little compressibility. The tampon element 12 has a withdrawal string 14 affixed to it and depending from it. The sheath 13 is of flexible flimsy material, such as a plastic of this type and more particularly polyethylene of 0.0005 inch in thickness, for example. Still more particularly, the polyethylene may be desirably treated to have high slip characteristics, such as DuPont low density polyethylene 100 S-101 treated to have high slip.

The sheath 13 may constitute a rectangular blank of polyethylene which is wrapped around the tampon element 12 and inner tube 11. Preferably the blank has a width that is greater in dimension than the internal circumference of the outer tube 10 so that the sheath 13 has overlapping side flaps 13a and 13b and preferably the width of the blank is less than the circumference to which the tampon element 12 expands when it is released from the outer tube 12.

In operation, the tampon assembly as illustrated in FIGS. 1 and 2 is inserted into the body cavity, such as the vagina, with the illustrated upper end foremost; and, when this is accomplished, the tampon element 12 is expelled from the outer tube 10 by moving the inner tube 13 inwardly into the tube 10 while holding the outer tube stationary. Since the tampon element 12 is under compression and is of an elastomeric material, under these circumstances, it would have a substantial gripping or binding effect on the inner surface of the tube 10 but for the existence of the sheath 13 and would require a substantial force to expel it from the outer tube 10. The sheath 13 slides in and moves outwardly from the outer tube 10 with the tampon element 12 and inner tube 13 and acts as a nearly frictionless bearing with respect to the inner surface of the outer tube 10 so that the expulsion of the tampon element 12 into the body cavity is quite easy with little force necessary on the inner tube 13 to cause the expulsion of the tampon element 12 from the tube 10. FIG. 3 shows the tampon element 12 partially expelled from the outer tube 10; and, as illustrated the tampon element 12 expands to a substantially greater diameter and circumference as it leaves the tube 10, separating the flaps 13a and 13b. When the tampon element 12 has been completely expelled from the tube 10, the tubes 10 and 13 and the sheath 13 are withdrawn from the body cavity. The tampon element 12 is in contact with the inner surfaces of the body cavity, and the element 12 thus remains in the body cavity; and this action is particularly facilitated due to the fact that the flaps 13a and 13b separate under the expanding action of the tampon element 12 as it leaves the tube 10.

For the reduction of the friction effect of the tampon element 12 with respect to the inner surfaces of the tube 10, it is not necessary that the sheath 13 have its sides overlapping with the flaps 13a and 13b when inside the tube 10 or even that the edges of the sheath 13 meet, but it is preferred that the edge portions of the sheath overlap with the flaps 13a and 13b, and it is preferred further that the tampon element 12 be rolled into the sheath 13 as the element 12 is inserted into the tube 10 during assembly with the sheath 13 holding the tampon element 12 in a considerably smaller diameter than the inside diameter of the tube 10. After the tampon element 12 and sheath 13 are in place within the tube 10, the tampon element 12 will expand slightly but the flaps 13a and 13b will still grip each other slightly and will hold the tampon element compressed to a slightly smaller diameter than the inside diameter of the tube 10 so that the expulsion of the tampon element 12 may be extremely easy even though the tampon element 12 expands to a considerable extent after it has been ejected from the tube 10, as is shown in FIG. 3.

The assembly as shown in FIGS. 1 and 2 may be put together by first wrapping the sheath 13, from a rectangular blank, around the tampon element 12 and the tube 13. As just mentioned, the wrapping of the sheath 13 about the tampon element 12 is preferably with the sheath holding the tampon element 12 compressed to a smaller diameter than the inside diameter of the tube 10. The sheath 13 is brought downwardly about the lower end of the tube 11 and is tucked inside the lower end of the tube 11 so as to fix the sheath with respect to the tube 11 whereby the sheath 13 will be withdrawn with the tubes 10 and 11 on withdrawal from the body cavity; and the tampon element 12, sheath 13 and tube 11 are moved upwardly inside the tube 10 on assembly, with the withdrawal string 14 extending downwardly through the tube 11.

The modified tampon assembly shown in FIG. 4 includes a tampon element 12A that is similar to the tampon element 12 but which has a rounded outer end 15 that protrudes from the outer tube 10. The sheath 13A is similar to the sheath 13 but is longer and completely envelopes the end 15 of the tampon element 12A, and the sheath 13A is folded over the end 15 with a fold 16 located within the outer tube 10. The sheath 13A has overlapping flaps 13aa and 13bb corresponding to the flaps 13a and 13b in the first described embodiment. The sheath 13A is of the same relatively frictionless material as the sheath 13, and since the end 15 of the tampon element 12A protrudes from the end of the tube 10 and is rounded, the relatively frictionless sheath 13A thereby provides a tapering end of the tampon assembly overlaid with a slick covering in the form of the end of the sheath 13A including the flap 16, making for easy insertion of the tampon assembly into the body cavity. When the tampon assembly is within the body cavity, the inner tube 13 is pushed into the outer tube 10, as with the first described embodiment, to expel the tampon element 12A from the outer tube; and, at this time the flap 16 moves out of the outer tube 10 and is released thereby so that the flap 16 and flaps 13aa and 13bb open up and release the tampon element 12A with respect to the rest of the assembly, allowing the tampon element 12A to make contact with the surfaces of the body cavity. The tubes 10 and 13 and the sheath 13A are then withdrawn from the body cavity allowing the tampon element 12A to remain therein.

FIG. 5 illustrates a mold 17 from which the tampon elements 12 and 12A may be made. A withdrawal string 18 is illustrated in this figure that is considerably longer than the string 14; and it will be understood that either type of string may be used. The mold 17 has a plurality of sharpened spike-like protrusions 19 extending inwardly into it and fixed to it, and the string 18 is shown with a knot 20 formed on its end and located close to the bottom of the mold 17. The material of the tampon element 12 or 12A is poured into the mold 17 in fluid state, with the gas forming particles therein for making the finished tampon element in the form of a sponge; and when the tampon element has set in sponge state, it is in the form as shown in FIG. 4. The spikes 19 extend into the tampon element 12 or 12A while the tampon element is still in the mold 17, and the tampon element is withdrawn from the mold 17 by simply pulling upwardly on the string 18. The tampon element 12 or 12A yields and slides upwardly over the spikes 19, releasing from the spikes 19 at this time. Preferably, for this purpose, the spikes 19 slant upwardly to permit easy release. The spikes 19 leave openings in the surface of the tampon element 12 or 12A and slightly tear the outer surface of the tampon element on withdrawal from the mold, so that no "skin" due to the molding operation which might be relatively fluid impervious remains on the surface of the tampon element 12 or 12A. Although the mold 17 is shown with a rounded bottom particularly for forming the rounded end of the tampon element 12A, the end of the mold 17 could just as well be flat particularly for the form of tampon element 12, as is apparent.

The tampon assemblies of the invention advantageously allow the expanding elastomeric tampon elements 12 and 12A to be easily ejected from their containing tubes 10, particularly due to the sheaths 13 and 13A acting as friction reducing bearing members between the tampon elements 12 and 12A and the inner surfaces of the tubes 10.

It is to be understood that the invention is not to be limited to the specific constructions and methods shown and described, except only insofar as the claims may be so limited, as it will be apparent to those skilled in the art that changes may be made without departing from the principles of the invention.

I claim:

1. A tampon assembly comprising an outer tube, a fluid absorbing tampon body within said tube and adapted to be expelled out of said outer tube, and a sheath of thin sheet material disposed between at least a part of the outer surface of said tampon body and the inner surface of said outer tube, said sheath being separate of said outer tube and tampon 0on body and having a greater frictional engagement with said tampon body than with aid outer tube so that, as the tampon body is expelled out of said outer tube, the sheath travels with said tampon body and facilitates the movement of the tampon body out of the outer tube.

2. A tampon assembly as set forth in claim 1, said tampon assembly also comprising an inner tube telescoped within said outer tube and arranged to expel said body from said outer tube when the inner tube is moved farther into said outer tube.

3. A tampon assembly as set forth in claim 2, said tampon body being made from an elastomeric sponge material and being of greater diameter than the inner diameter of said outer tube when the tampon body is in free condition.

4. A tampon assembly as set forth in claim 3, said sheath overlying the complete outer surface of said tampon body.

5. A tampon assembly as set forth in claim 3, said sheath extending around said tampon body and overlapping the tampon body with a pair of flaps.

6. A tampon assembly as set forth in claim 3, said sheath extending around said tampon body and overlapping the tampon body with a pair of flaps, said flaps gripping each other slightly so as to hold said tampon body at a diameter that is slightly less than the inner diameter of said outer tube.

7. A tampon assembly as set forth in claim 3, said sheath being of polyethylene.

8. A tampon assembly as set forth in claim 3, said sheath also extending for the length of said inner tube and being tucked into the end of said inner tube remote from said tampon body.

9. A tampon assembly as set forth in claim 3, said tampon body having a rounded end protruding from the end of said outer tube and said sheath covering said rounded end.

10. A tampon assembly as set forth in claim 9, said sheath having a flap extending from said rounded end of said tampon body and extending into said outer tube.

* * * * *